F. H. L. KUNTZE.
RESILIENT WHEEL.
APPLICATION FILED NOV. 4, 1915.
1,191,977.
Patented July 25, 1916.
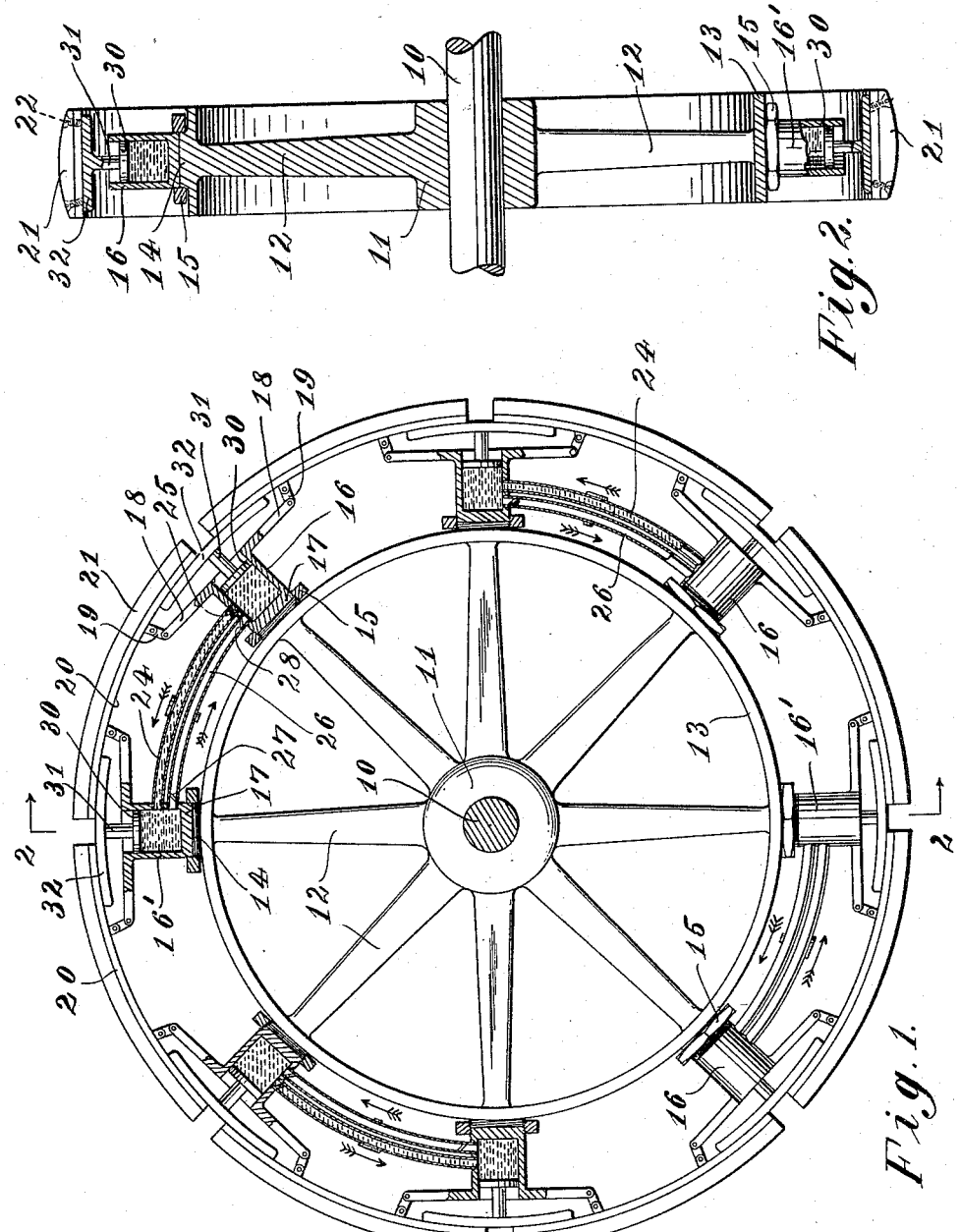
INVENTOR
Fredrick Hermann Ludwig Kuntze.
BY
HIS ATTORNEY

UNITED STATES PATENT OFFICE.

FREDRICK HERMANN LUDWIG KUNTZE, OF BROOKLYN, NEW YORK, ASSIGNOR OF ONE-THIRD TO JACOB GOTTLIEB, OF BROOKLYN, NEW YORK.

RESILIENT WHEEL.

1,191,977.     Specification of Letters Patent.     Patented July 25, 1916.

Application filed November 4, 1915. Serial No. 59,550.

*To all whom it may concern:*

Be it known that I, FREDRICK HERMANN LUDWIG KUNTZE, a subject of the Emperor of Germany, and resident of Brooklyn, in the county of Kings and State of New York, have invented certain new and useful Improvements in Resilient Wheels, of which the following is a specification.

This invention relates to improvements in resilient wheels as used for vehicles of the better grade, particularly those adapted to convey passengers smoothly without jar as they pass over ordinary roadways.

The principal object of the invention is to provide means for the adequate accomplishment of the fore-going purpose, by the interposition of a novel cushioning device between the flexibly mounted periphery of the wheel, and a rigid interior portion, which object, together with others analogous, are attained by the construction set forth in this specification and shown in the accompanying drawings which form a material part thereof, and are briefly described as follows:—

Figure 1 is a side elevation and partial section of a wheel made in accordance with the invention. Fig. 2 is a transverse sectional view, taken on line 2—2 of Fig. 1.

In the drawings the numeral 10 refers to the shaft, which has mounted on it the hub 11, of any preferred type or plan as shown.

From the hub radiate the spokes or arms 12, engaging at their outer ends with a rigid band 13 formed with short radial projections 14 in register with the spoke ends and furnished with screw threads, receptive of the clamp nuts 15, by which the cylinders 16 are engaged rigidly with the band 13.

Extending within the confines of the wheel, in opposite directions from the outer ends of the cylinders, are arms 18 carrying links 19, pivoted both to the arms and to the segmental tire 20 in such manner that the tire is constrained from outward movement but free to move toward the center of the wheel limitedly, a segmental cushion 21, being attached to the tire elements by the screws 22 or other equivalent fastenings.

In this construction the bottom 17 of the cylinders 16 and 16′ are imperforate, the cylinders being arranged in pairs, respectively right and left, and connected by tubes 24 and 26, in the former of which is a check valve 25, while in the other are two similar valves, 27 and 28, one being at either end. Within these cylinders are plungers 30, having stems 31 engaging at their outer ends with segments 32 which press against the adjacent ends of the tire segments 20, forcing them outwardly, the cylinders 16 and 16′ together with the tube 24, being filled with a liquid, as water, oil, or such combination as may be preferred.

In operation, pressure being applied to the wheel, the ends of the tire segments are forced in the direction of the center of the wheel, causing the plunger 30 to force the liquid to pass through the valve 25 and tube 24 into the cylinder 16′ and from thence into the tube 26; when the pressure is transferred along the wheel the liquid in the cylinder is forced farther through the tube 26, refilling the cylinder 16, thus causing a constant circulation of the liquid as the wheel is revolved giving a cushion effect to the tire by the hydraulic means employed.

Obviously any preferred form of check valves, piston packings and other minutiæ may be employed without vitiating the general principal involved.

In the modification shown in Figs. 3 to 7 inclusive, open ended cylinders 40 are attached to the band 13 in the manner previously described, and have mounted on their outer ends caps 41 in which are secured rigid segments 42 carrying near their centers, semi-eliptic springs 43, or full elliptic springs 44, as shown in Fig. 5. These springs are so mounted as to exert force against the segmental tires 45, covered by contacting cushions 46 and having at their inner end plates 47 against which the beveled ends of the segments 45 contact, the segments being held with relation to the segments 42 by means of the links 48 which are slotted at one end 49 to allow the tire to move freely under load as the wheel is revolved. Also pressing outwardly against the plates 47, are the heads 50, connected by stems 51 to the plungers 52, movable in the cylinders 40 and pressed outwardly by the push springs 53, thus affording a cushioning effect similar to that attained by the means previously described.

From the foregoing it will be seen that the structures presented represent embodiments substantially alike in the results attained and will be understood without further elaboration.

Having thus described my invention, and ascertained its construction and use, what I claim as new and desire to secure by Letters Patent, is:—

1. In a wheel, the combination with a hub, a rigid band concentric therewith, and a plurality of spokes engaging therebetween, of cylinders secured to said band in register with said spokes, and connected in pairs, pistons movable in said cylinders, cross-heads carried by said pistons, segments linked at their ends to said cylinders, said segments forming the rim of the wheel, and means whereby liquids contained in said cylinders are caused to circulate from one cylinder to the other in each pair as the wheel is rotated.

2. In a wheel, the combination with spokes extending radially therefrom and a rigid band engaging the outer ends of said spokes, hydraulic cylinders on said band in register with said spokes, tubes connecting said cylinders in pairs, pistons operative in said cylinders, cross-heads attached to said pistons, cushioned segments constituting the wheel tire, flexible links engaging said tire elements and said cylinders, and means in said connecting tubes whereby the contents of said cylinders are partially transferred from one to the other as the wheel travels.

Signed at New York, in the county of New York and State of New York this 4th day of October A. D. 1915.

FREDRICK HERMANN LUDWIG KUNTZE.

Witnesses:
O. A. GEIER,
JACOB GOTTLIEB.

Copies of this patent may be obtained for five cents each, by addressing the "Commissioner of Patents, Washington, D. C."